No. 628,553. Patented July 11, 1899.
P. A. SCHUMACHER.
HARROW.
(Application filed Aug. 4, 1898.)
(No Model.)
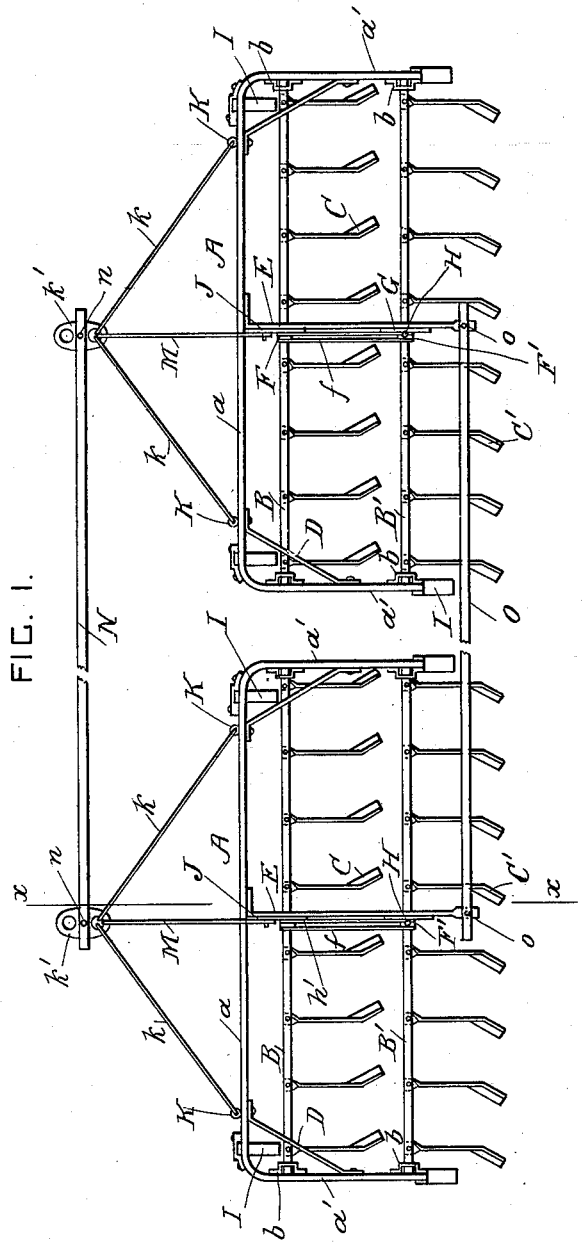
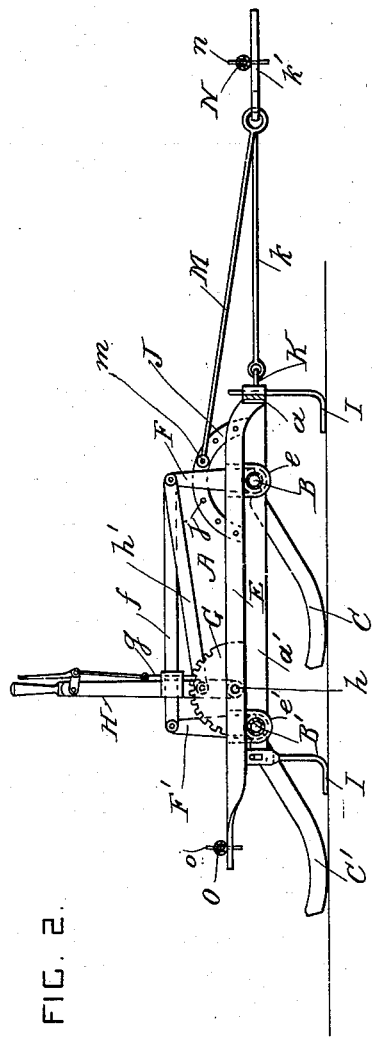
WITNESSES
INVENTOR
Peter A. Schumacher
by Herbert W. T. Jenner.
Attorney

UNITED STATES PATENT OFFICE.

PETER A. SCHUMACHER, OF REYNOLDS, NORTH DAKOTA.

HARROW.

SPECIFICATION forming part of Letters Patent No. 628,553, dated July 11, 1899.

Application filed August 4, 1898. Serial No. 687,728. (No model.)

*To all whom it may concern:*

Be it known that I, PETER A. SCHUMACHER, a citizen of the United States, residing at Reynolds, in the county of Grand Forks and State of North Dakota, have invented certain new and useful Improvements in Harrows; and I do hereby declare the following to be a full, clear, and exact description of the invention, such as will enable others skilled in the art to which it appertains to make and use the same.

This invention relates to harrows; and it consists in the novel construction and combination of the parts hereinafter fully described and claimed.

In the drawings, Figure 1 is a plan view of the harrow. Fig. 2 is a section taken on the line $x\ x$ in Fig. 1.

The harrow is formed of two similar harrow-sections A A, arranged side by side. Each harrow-section A is provided with a frame, which has a front $a$ and sides $a'$ and which is open at the rear.

B and B' are tubular shafts, which are journaled in bearings $b$, secured to the sides $a'$. The shafts are made tubular so as to be very light, and the sides $a'$ prevent them from sliding endwise in their bearings.

C and C' are knives, the front ends of which are secured to the shafts B and B', respectively, in any approved manner. The knives all have cutting edges on their lower sides and the knives C' are arranged behind the knives C. The rear parts of the knives C are curved laterally in one direction and the rear parts of the knives C' are curved laterally in the reverse direction.

D are diagonal braces secured to the front of the frame and to its sides near the bearings of the rear shaft. These braces prevent the sides of the frame from spreading.

E is a longitudinal bar rigidly secured at one end to the middle part of the frame and provided on its under side with bearings $e\ e'$ for steadying the shafts B and B', respectively.

F is a lever which projects upward from the shaft B, and F' is a lever which projects upward from the shaft B'. A connecting-rod $f$ couples the levers F and F' together.

G is a notched quadrant secured to the rear part of the bar E between the shafts B and B'.

H is a hand-lever pivoted on a pin $h$, carried by the bar E, and $h'$ is a rod pivoted to the hand-lever and to the upper part of the lever F. The hand-lever H is provided with a catch $g$, which engages with the notched quadrant, so as to hold the hand-lever and the two rows of knives in any desired position. The knives are raised and lowered by means of the said hand-lever.

I are vertically-adjustable runners clamped to the front and rear parts of the frame, so as to support the weight of the harrow-section when the knives are raised. Each runner consists of a bar the lower portion of which projects rearwardly at an angle to the upper portion, which is clamped to the frame.

J is a longitudinally-arranged curved plate secured to the front part of the bar E and provided with a series of holes $j$.

K are eyes secured to the front of the frame near its ends, and $k$ are converging rods pivoted at their rear ends to the eyes K. The front ends of the rods $k$ are pivoted to the rear part of a draft-link $k'$.

M is a rod which has its front end pivoted to the link $k'$ between the two rods $k$, and $m$ is a pin which connects the rear end of the rod M with any one of the holes $j$. The height of the link $k'$ above the ground, and therefore the height of the line of draft, is regulated by connecting the rod M to one or another of the holes $j$ of the plate J.

N is a tube which has its end portions pivoted by vertical pins $n$ to the middle parts of the links $k'$ of the two harrow-sections A A.

O is a tube which has its end portions pivoted by vertical pins $o$ to the rear ends of the bars E of the two harrow-sections.

Draft appliances of any approved construction are attached to the front ends of the links $k'$.

The bars N and O are formed of tubes for lightness, and they permit each harrow-section to move slightly in advance of the other and at the same time keep the harrow-sections at a uniform distance apart.

The two harrow-sections are preferably arranged at such a distance apart as will make the adjacent end knives come at substantially the same distance apart as all the other knives.

In this manner the harrow operates as a single long harrow and not as two harrows coupled together.

What I claim is—

In a harrow, the combination, with two harrow-sections, each of the said harrow-sections being provided with a plate J having a series of holes $j$, a draft-link $k'$, and rods $k\,k$ and M supporting the draft-link in a fixed position in front of the harrow-section and permitting its height above the ground to be varied; of a transverse bar N pivoted to the said draft-links of the harrow-sections, and a second transverse bar pivoted to the rear parts of the harrow-sections, substantially as set forth.

In testimony whereof I affix my signature in presence of two witnesses.

PETER A. SCHUMACHER.

Witnesses:
T. S. HERRING,
M. V. HOSTETTER.